US011931647B2

(12) United States Patent
Upson et al.

(10) Patent No.: US 11,931,647 B2
(45) Date of Patent: Mar. 19, 2024

(54) INTEGRATED SCREEN WITH USB AND HDMI FOR GAME CONSOLE

(71) Applicants: Stewart Upson, Avalon Beach (AU); Andrew Upson, Murarrie (AU)

(72) Inventors: Stewart Upson, Avalon Beach (AU); Andrew Upson, Murarrie (AU)

( * ) Notice: Subject to any disclaimer, the term of this patent is extended or adjusted under 35 U.S.C. 154(b) by 0 days.

(21) Appl. No.: 17/743,398

(22) Filed: May 12, 2022

(65) Prior Publication Data
US 2022/0362662 A1 Nov. 17, 2022

Related U.S. Application Data

(60) Provisional application No. 63/188,391, filed on May 13, 2021.

(51) Int. Cl.
*A63F 13/26* (2014.01)
*A63F 13/21* (2014.01)
(Continued)

(52) U.S. Cl.
CPC .............. *A63F 13/26* (2014.09); *A63F 13/21* (2014.09); *A63F 13/214* (2014.09); *A63F 13/23* (2014.09); *A63F 13/24* (2014.09); *A63F 13/30* (2014.09); *A63F 13/323* (2014.09); *A63F 13/49* (2014.09); *A63F 13/493* (2014.09); *A63F 2300/1025* (2013.01); *A63F 2300/1043* (2013.01);
(Continued)

(58) Field of Classification Search
CPC ..... A63F 13/26; A63F 13/98; A63F 2300/301
See application file for complete search history.

(56) References Cited

U.S. PATENT DOCUMENTS 5,260,884 A * 11/1993 Stern ..................... G06F 1/1628
361/679.55
6,145,661 A * 11/2000 Jung ..................... A45C 13/02
190/102
(Continued)

FOREIGN PATENT DOCUMENTS

CN 101211242 A * 7/2008 ........... G06F 1/1616
CN 114007110 A * 2/2022 ......... G06F 16/9535
(Continued)

OTHER PUBLICATIONS

"The Xbox's plugs and ports, a visual history," by Cameron Faulkner, published Mar. 17, 2020. Source: https://www.theverge.com/2020/3/17/21158178/xbox-plugs-ports-hdmi-ethernet-memory-card-storage-visual-history (Year: 2020).*
(Continued)

*Primary Examiner* — Steven J Hylinski
(74) *Attorney, Agent, or Firm* — Steven R. Fairchild (57) ABSTRACT

The present invention is a portable gaming and entertainment system (or "environment") for use with a video game console and related components that allows the user thereof to easily, safely and conveniently transport the system. The system comprises an integrated screen with USB and HDMI capabilities that connect directly to the video game console. The integrated screen contains monitor and speaker, and is operative to be opened and maintained at a position to provide a desirable viewing angle for a user. The integrated screen closes against the video game console so that the user may easily transport and/or store the entire system.

3 Claims, 6 Drawing Sheets

(51) Int. Cl.
*A63F 13/214* (2014.01)
*A63F 13/23* (2014.01)
*A63F 13/24* (2014.01)
*A63F 13/30* (2014.01)
*A63F 13/323* (2014.01)
*A63F 13/49* (2014.01)
*A63F 13/493* (2014.01)

(52) U.S. Cl.
CPC ..... *A63F 2300/20* (2013.01); *A63F 2300/301* (2013.01); *A63F 2300/403* (2013.01)

(56) References Cited

U.S. PATENT DOCUMENTS

| | | | | |
|---|---|---|---|---|
| D555,666 | S * | 11/2007 | Hussaini | D21/333 |
| D555,667 | S * | 11/2007 | Hussaini | D21/333 |
| D728,031 | S * | 4/2015 | Mercier | D21/333 |
| 9,333,423 | B2 * | 5/2016 | Mercier | A63F 13/32 |
| 10,758,829 | B2 * | 9/2020 | Cragg | A63F 13/98 |
| 2004/0048672 | A1 * | 3/2004 | Hussaini | A63F 13/26 463/46 |
| 2004/0048674 | A1 * | 3/2004 | Hussaini | A63F 13/90 463/46 |
| 2005/0176508 | A1 * | 8/2005 | Chastain | B60R 11/02 463/46 |
| 2005/0202879 | A1 * | 9/2005 | Hussaini | G06F 1/1605 463/47 |
| 2005/0250583 | A1 * | 11/2005 | White | A63F 13/98 463/47 |
| 2007/0275783 | A1 * | 11/2007 | Hussaini | A63F 13/25 463/47 |
| 2008/0268950 | A1 * | 10/2008 | Hussaini | A63F 13/25 463/31 |
| 2010/0079597 | A1 * | 4/2010 | Stokes | H04H 60/32 348/184 |
| 2010/0309962 | A1 * | 12/2010 | Freundlich | H04N 21/4436 375/219 |
| 2011/0092294 | A1 * | 4/2011 | Mercier | A63F 13/90 463/46 |
| 2011/0162014 | A1 * | 6/2011 | Komori | H04N 21/4112 725/74 |
| 2012/0133833 | A1 * | 5/2012 | Yoshida | H04N 5/63 348/730 |
| 2012/0172116 | A1 * | 7/2012 | Mercier | A63F 13/26 463/30 |
| 2014/0267933 | A1 * | 9/2014 | Young | H04N 21/43615 348/734 |
| 2020/0222816 | A1 * | 7/2020 | Mercier | A63F 13/98 |

FOREIGN PATENT DOCUMENTS

| | | | | |
|---|---|---|---|---|
| RU | 119480 | U1 * | 8/2012 | A45C 11/00 |
| WO | WO-2019014378 | A1 * | 1/2019 | A63F 13/00 |

OTHER PUBLICATIONS

"About the Wii's compatibility with USB," published Feb. 2, 2010. Source: https://www.reddit.com/r/WiiHacks/comments/gisdq5/all_about_the_wiis_compatibility_with_usb/ (Year: 2010).*

* cited by examiner

INTEGRATED SCREEN WITH USB AND HDMI FOR GAME CONSOLE

CROSS REFERENCE TO RELATED APPLICATION

This application claims the benefit of U.S. Provisional Patent Application No. 63/188,391, filed on May 13, 2021, and incorporated herein by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The field of present invention relates generally to the field of custom portable gaming and entertainment environments. In particular, the present invention relates to an integrated screen that has an audio outputs, LED screen, HDMI, and USB, and connects directly to a video gaming console.

BACKGROUND OF THE INVENTION

The following description includes information that may be useful in understanding the present invention. It is not an admission that any of the information provided herein is prior art or relevant to the presently claimed invention, or that any publication specifically or implicitly referenced is prior art.

Many people enjoy playing games on and otherwise utilizing gaming and entertainment consoles, such as Microsoft's Xbox®, Sony's Play Station 3®, Nintendo Wii®, and the like. Hereinafter, these and all related gaming and/or entertainment consoles are referred to as a "gaming console" or "video game console."

As known, gaming consoles are configured to receive a game or entertainment source, typically an optical disc (e.g., a CD or DVD), Digital File Transfer, or Streamed Digital Content from another device, and allow the user to play and/or watch the game, movie or other entertainment material on the game console. Most game consoles are adapted to play specially configured games that take advantage of the visual and audio aspects of the particular game console. In addition, most game consoles are also configured to play standard movies, music and other entertainment materials that are available on CDs, DVDs, Blue Ray® discs, Digital Content, and the like.

The most commonly utilized game consoles are also configured to allow the user to connect to the Internet, a local area network (LAN), or wide area network (WAN) through a wired or wireless connection, directly or indirectly, so he or she may transmit and receive data, particularly gaming data, with other persons or websites. In one use, the person playing a game on his or her game console can communicate with others, whether located nearby or in a different country, to play games with or against.

Video game consoles are typically sold as a unit that includes the console, one or more game playing devices (commonly referred to as "controllers"), and various wires and cables that are needed to operate the game console. Although required to utilize the game console and to play games on and/or watch movies therewith, game consoles are generally not sold with any video or audio playing devices. Instead, a person wanting to utilize the game console must connect it to a television, monitor, or other video device on which the game or movie will be displayed. This is also true for the audio portion of the game console; the person utilizing the game console must feed the audio signal through the video device, such as a television or monitor having speakers attached thereto, connect the game console to one or more external speakers (which is usually preferred by many persons who play games or watch movies), or utilize another audio device to hear the audio portion of the game or movie.

Although having to provide and connect the game console to separate video and audio devices in order to utilize the game console may be seen as a disadvantage to some, most people who utilize game consoles prefer such an arrangement so they can connect to video and audio devices of their own choosing, typically selecting the best quality of video and audio devices that he or she can afford. One limitation that results from not having video and audio devices fixedly associated with the game console is that playing games or watching movies on the game console requires the user to connect to available and appropriately configured video and audio devices. This limits the portability of game consoles and sharply contrasts their use with laptop and similar portable computing devices, which have a fixedly attached monitor and speakers.

As well known in the art, many people who play games on game consoles are very serious and competitive with their game play. These people are commonly referred to as "gamers." With regard to gamers, although they can play games on the game consoles by themselves (i.e., competing against the game itself), most prefer to compete against other players while the other players are playing the same game. One way to compete against other players is to play the game over the Internet with other players at their own game consoles controlling their own game (but competing against the other player(s)). Another way to compete against other players is for the gamers to physically get together in the same room and utilize the same game console and the same video and audio devices connected to the jointly utilized multi-game console configuration. The advantage of playing games over the Internet or other network is that each player has his or her own video and audio devices.

Game consoles also support multiple player sessions with a single game console. To facilitate getting together for competitive play, virtually all game consoles have multiple connection ports for multiple controllers, which ports are configured to feed multiple input signals into the game, and the games playable on the game consoles are configured to allow information (e.g., object movement and other control) from each of the multiple controllers. Game consoles may also facilitate joint play by multiple players in the same room by dividing the visual display into multiple or split screens, one screen section for each person, that allows each person to see and control his or her own game play. Most gamers, however, consider the use of split screens to have several important limitations, namely a much smaller visual display of their play (because the screen is split) and the visual distraction which results from having the other player's screens adjacent their own screen. The smaller visual display generally makes it much more difficult for the player to see the graphics provided by the game, which are usually quite extensive and sophisticated (in fact, represent much of the value of the game console and games), and substantially reduces the player's enjoyment of the game.

Another problem with split screens is that they allow one player to see the screens of his or her competitors, thereby allowing each player to view the movements or other action in a manner that reduces competitive play by eliminating the element of surprise or advantage of personal strategy. The various limitations of presently available multiple player game play with split screens could be avoided if each person brought his or her own game console with their own video and audio devices (e.g., a television or monitor with speakers) to the location where the players are getting together to play. This would require each person to transport their television, monitor or other video device to the game location, connect their game console to the video device and setup the game console (i.e., connect the controller and cables).

Generally, however, such requirements are impractical and, as a result, very rarely do players get together in this manner. In fact, most serious gamers utilize video devices that are rather large, somewhat heavy and/or bulky and expensive, making their movement even more impractical. Even when sized such that they would be relatively easy to move, generally there is no practical manner to move the video device with the game console in a manner that reduces the likelihood of damaging the video device and/or game console.

Moreover, when living in a confined or shared space likes students in a dorm, having the space to run a video game console is very difficult.

Mobile gaming solutions also exist (such as games on iPads etc) but these lack the power and quality of games on a video game console.

Alternative mobile screens exist, but are essentially just separate screens and do not integrate with the console. They require multiple cables and dedicated power solutions. Examples of this solution U.S. Pat. No. 9,333,423 to Mercier and its related patent family ("Mercier Design").

The Mercier Design was incorporated into various commercial products, including the Sentinel Pro Xp 1080P Portable Gaming Monitor, Guardian Pro XP Ultimate Personal Gaming Environment, Gaems Sentinel, and the Case Club Waterproof Playstation 4 Portable Gaming Station with Built-In Monitor & Storage for PS4 Controllers & Games.

In the early 2000, Sony developed the PSONE SCPH-131/94017, which screwed a screen onto the PS 1. However, this had numerous drawbacks. First, it was a small screen with poor resolution. Likewise, the circular shape of the screen did not fully protect the PS 1 when folded down. Moreover, console manufacturers appeared to discarded developing this idea and instead later prioritized the commercialization of products that embodied the Mercier Design.

However, none of the prior art discloses the present invention.

SUMMARY OF THE INVENTION

The present invention discloses a portable system (or "environment") for allowing a gamer and other game console players to easily, safely and conveniently move a game console and LED from one location to another. The environment of the present invention provides an easily transportable integrated screen that houses an LED screen that allows the video game console to be transported and played.

The environment of the present invention provides a much safer and easier means for a gamer to utilize a game console in a "community" or network environment with friends and/or family who may be competing against him or her at a game. With the environment of the present invention, the gamers will not need to share a television or monitor or be hindered by a single location to utilize a specific video device or by utilizing split screen technology, which results in small screens placed side-by-side.

Instead, with the environment described herein, the gamers will each have their own full screen monitor environment. In addition to gamers, the environment of the present invention will allow businesses to provide an all inclusive gaming and multimedia unit for entertaining customers, employees and others in an easy to store package that can be freely moved.

If desired, the environment could be modified to include a keyboard and other computer functionality. If desired, the environment could also be utilized for non-gaming or entertainment purposes, such as a training environment to present media and/or marketing.

Accordingly, an aspect of some embodiments of the present invention is to provide a portable gaming and entertainment environment that has the advantages discussed above and which overcomes the disadvantages and limitations associated with presently available environments for transporting and playing games and/or movies on a game console or providing a personal gaming and entertainment portable environment and the like.

It is also an aspect of some embodiments to offer a desirable viewing angle and access to all the inputs of a gaming console.

It is also an aspect of some embodiments to provide a portable gaming and entertainment environment that allows the user to play games or watch movies on his or her game console at virtually any location with a minimum amount of onsite configuration and/or setup. It is also an aspect of some embodiments to provide a portable gaming and entertainment environment that is configured to allow the user to connect the game console to the Internet or in a multi-console configuration to a network environment so he or she may compete against other players utilizing their game console environment no matter where those players are located locally within the same location or globally external to his or her location. It is also an aspect of some embodiments to provide a portable gaming and entertainment environment that generally comprises an easily transportable case which safely and conveniently houses a game console, video device (e.g., a monitor), one or more audio devices, game controllers, one or more game or movie disks, and the various gaming peripherals, wires and/or cables necessary to utilize the game console for playing games or watching movies, all in a manner that protects these components while being transported, stored, and operated.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF THE PREFERRED EMBODIMENTS

For a more complete understanding of the present invention, the objects and advantages thereof, reference is now made to the ensuing descriptions taken in connection with the accompanying drawings briefly described as follows.

With reference to the figures where like elements have been given like numerical designations to facilitate the reader's understanding, embodiments of the present invention are set forth below. The enclosed text and drawings are merely illustrative of one the embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show a certain game console and configurations for the components utilized with the game console, those skilled in the art will readily understand that this is merely for purposes of simplifying the present disclosure and that the present invention is not so limited.

Figure 1:
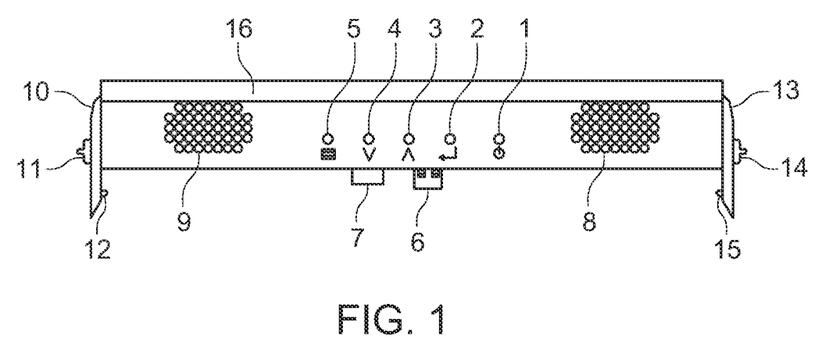
FIG. 1 shows the invention as viewed vertically from above.
Figure 2:
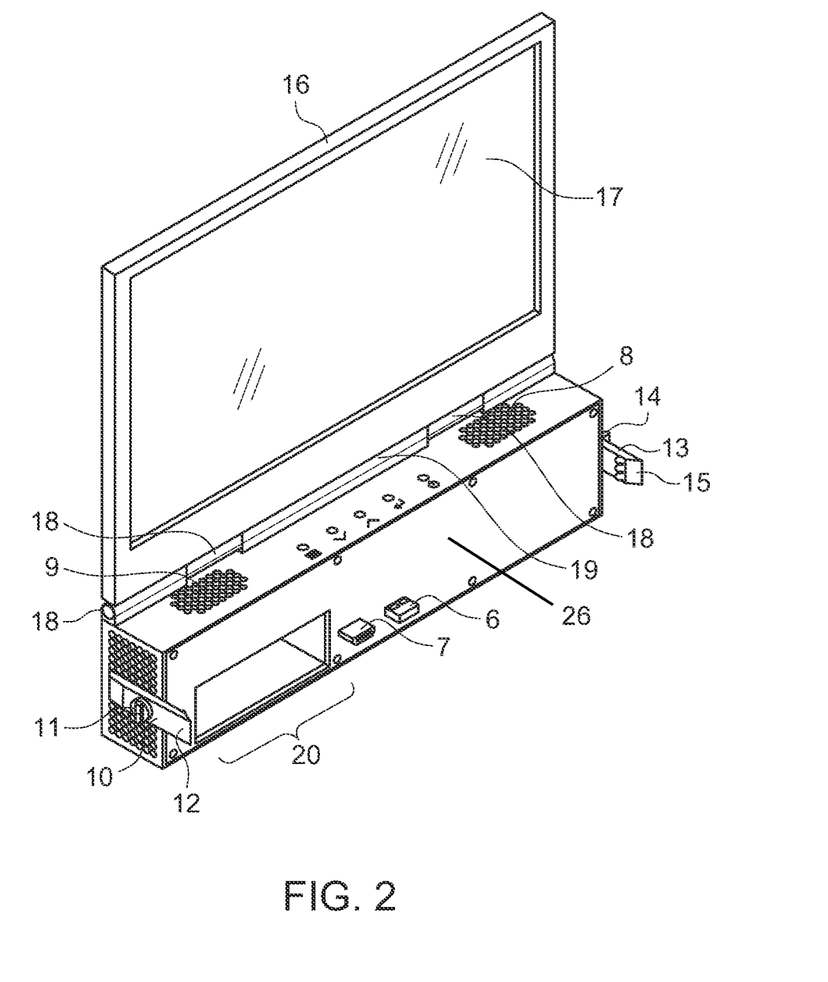
FIG. 2 shows the invention as viewed from the front-right, looking downwards.
Figure 3:
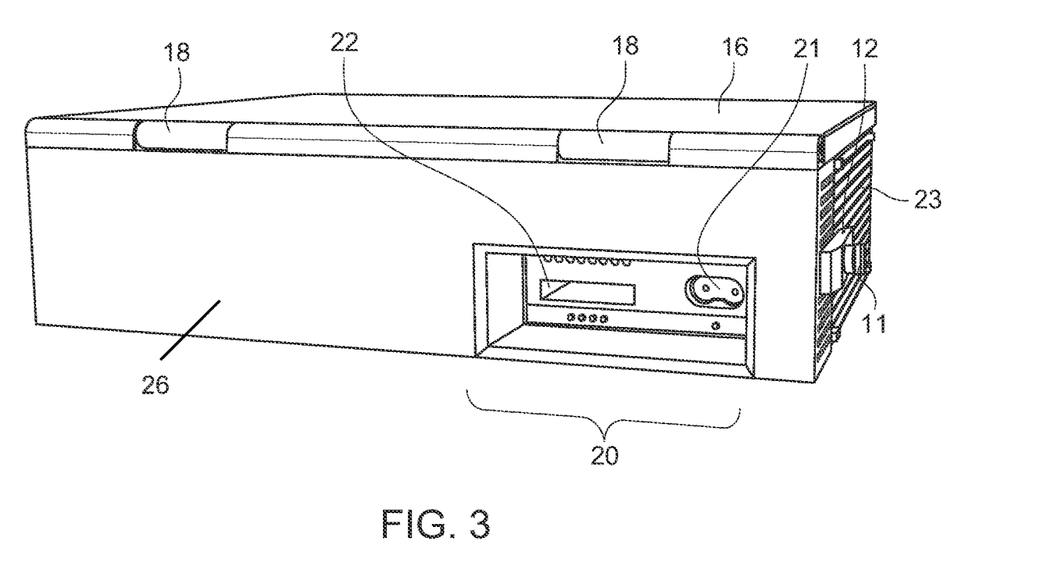
FIG. 3 shows the invention as viewed from the rear with the screen closed down upon the gaming console.
Figure 4:
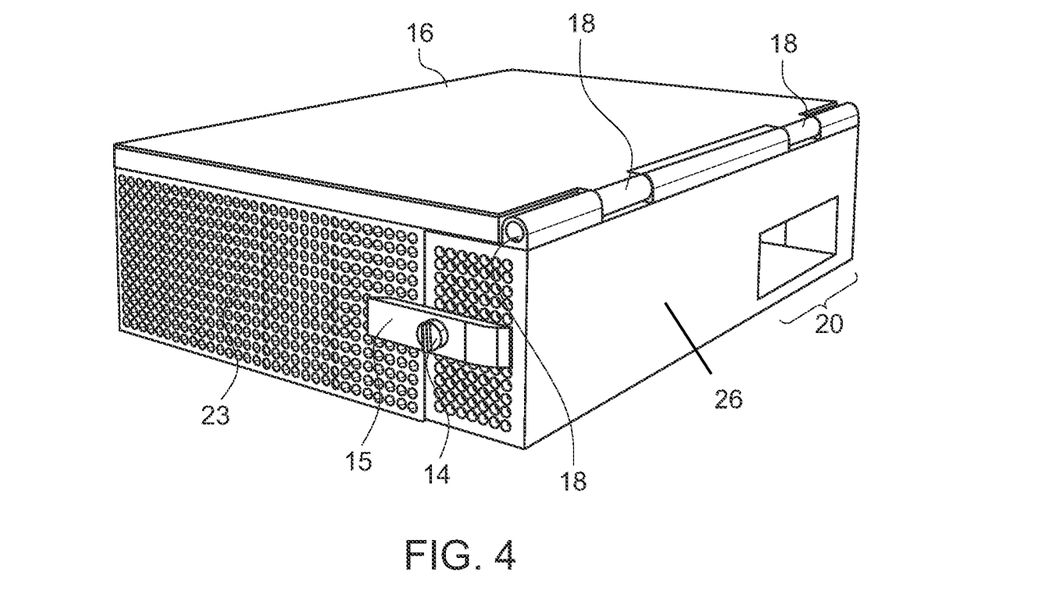
FIG. 4 shows the invention as viewed from the rear-left with the screen closed down upon the gaming console.
Figure 5:
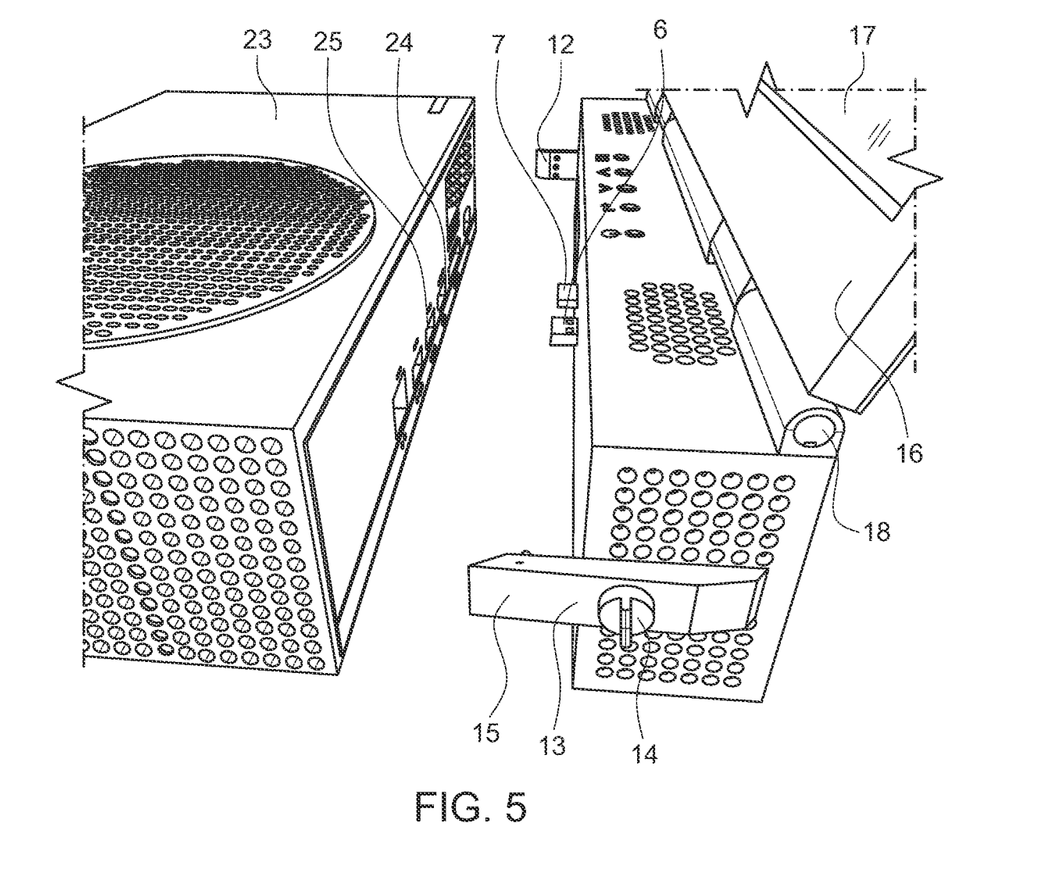
FIG. 5 shows the invention as viewed from the left with the screen upwards and unattached to the gaming console.
Figure 6:
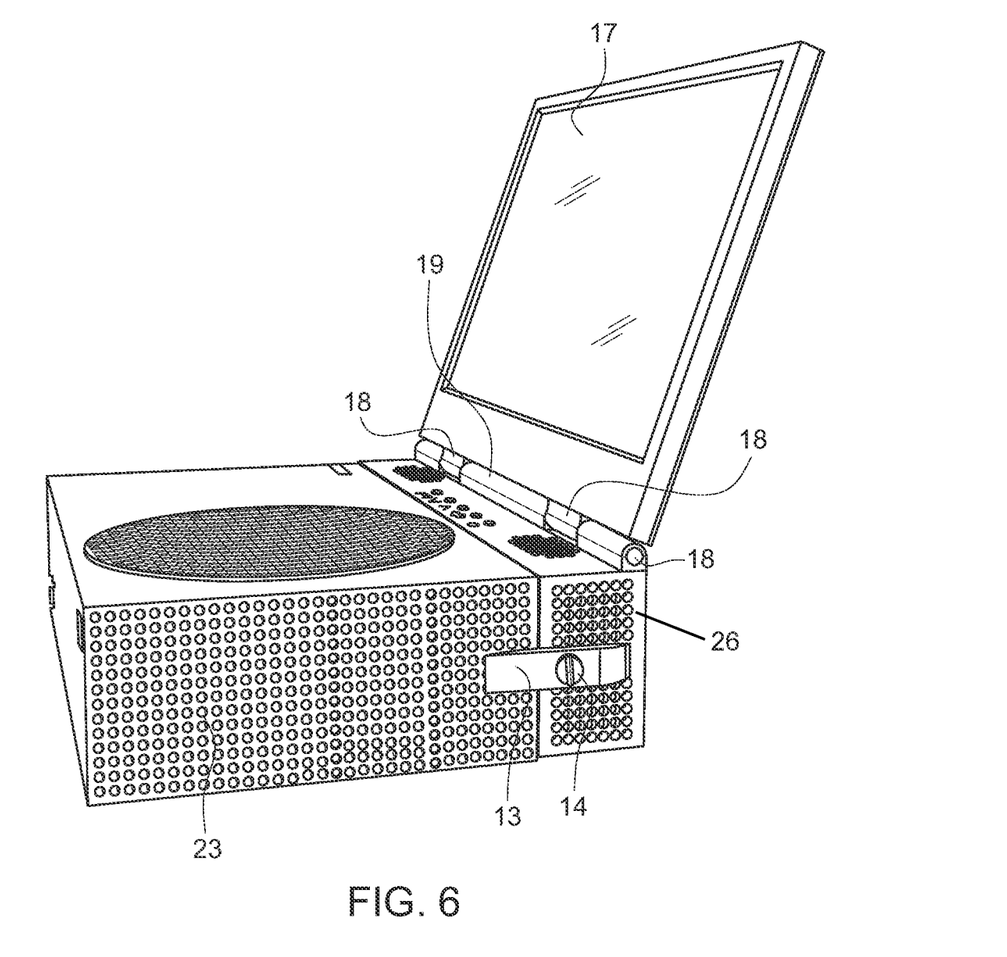
FIG. 6 shows the invention as viewed from the left with the screen upwards and fully attached to the gaming console.

Reference is made to FIGS. 1-6. A common numbering scheme is present for all figures.

As shown, Item (1) is the Power Button. An operator would appreciate that this button turns on the power to the monitor screen.

As used herein, an Operator is an individual who connects the present invention to a video game console and interacts with the menu to optimize the experience playing the video game console with the present invention. The Operator can also disconnect the assembly, or store it.

In a preferred embodiment, turning on the monitor screen allows an operator to interact with the monitor outside of the functions of the game console. Items 2-5 enable this.

Item (2) is the Return Button. Item (3) is the Scroll-Up Button. Item (4) is the Scroll-Down Button. Item (5) is the Menu Button. In a preferred embodiment, pressing Item (5) brings up the monitor's menu. The operator can then scroll up and down along the menu using Items (3) and (4), respectfully. Once the correct menu item is designated, the operator can select one using Item (2), the Return Button. In a preferred embodiment, the Operator can press Item (5) a second time to turn the monitor menu off.

Item (8) is the Right Audio Speaker and Item (9) is the Left Audio Speaker. In a preferred embodiment, the volume would be controlled by the operator through interfacing the monitor menu.

Item (6) is the USB Connector. Item (7) is the HDMI Connector. Item (10) is the Left Connector Plate. Item (11) is the Left Connector Thumbscrew. Item (12) is the Left Connector Latch. Item (13) is the Right Connector Plate. Item (14) is the Right Connector Thumbscrew. Item (15) is the Right Connector Latch. Item (23) is the Gaming Console. An Operator will appreciate that Items (6) and (7) respectfully slide into Items (25) and (24), which are the Gaming Console HDMI Port and Gaming Console USB Ports, respectfully. At this time, the Operator places the two respective connector latches (Items (12) and (15)) to grasp the gaming console (Item (23)). These are held in place by the twisting of the respective connector plate thumbscrew (Items (11) and (14)), which presses the connector plate latches to the gaming console. Thus, this act secures the Gaming Console (23) to the invention via the respective connector plates (Items (10) and (13).

An Operator will appreciate that to remove the Gaming Console, the Operator loosens the respective connector plate thumbscrews (Items (11) and (14)) which releases the respective connector latches (Items (12) and (15)).

Item (16) is the Screen Housing Plate, which secures the LED Screen (Item (17)). In a preferred embodiment, all the circuitry and wires which connect the USB and HDMI between the Gaming Console and the screen monitor are contained in the integrated base (26).

In a preferred embodiment, the Screen Housing Plate has the same dimensions of length and width that match the length and width of the video game console. This matching of dimensions is preferred for the storage and transport.

In a preferred embodiment, the Screen Housing Plate has a light that illuminates when the device is powered. This alerts the Operator that the present invention is functioning properly and is on.

The video game console's USB port provides power to the present invention, including the LED screen, screen controller, and speakers. No external power source is required other than the consoles original power connection. Since the present invention has an integrated mounted USB plug, no USB cable is required.

The video game console's HDMI port provides the display signal for the LED screen, and sound signal to the audio speakers. The HDMI connection also allows for the present invention to send a command signal to the Game Console to turn off. Since the HDMI plug is integrated into the present invention, no HDMI cable is required.

Item (18) is the Axial Cylinder, which allows the LED Screen and Housing Plate to rotate along an axis. Item (19) is the Axial Cylinder Housing Structure, which both houses the Axial Cylinder and pivotally attaches the Screen Housing Plate to the Integrated Base (Item (26)). This allows the LED Screen to be raised when an Operator wants to play the Gaming Console, but also allows for it to be closed whereby the LED Screen is pressed against the Gaming Console. This allows for storage, travel, and protection of both the LED Screen and the Gaming Console.

Item (20) is the Support Lumen. Item (21) is the Console Power Cable Receptor. Item (22) is the Gaming Console Memory Expansion Slot. In a preferred embodiment, the Support Lumen is large enough to enable access for the power cables and memory expansion for the gaming console.

In a preferred embodiment, the present invention contains a magnetic switch that detects when the Screen Housing Plate (16) is closed downwards. In a preferred embodiment, this magnetic switch sends a command message to the LED to screen to turn off. In addition, this magnetic switch sends an HDMI command message via the to the Game Console to turn off. Both of these operations ensure that the Game Console and LED screen do not consume electricity and generate excess heat when not operated.

In an alternative embodiment, the Support Lumen is closed. Instead, the invention houses a battery or capacitor which connects directly to Console Power Cable Receptor. This would enable both the device to be used in remote locations where access to electricity may be limited.

As set forth above, the video game console can be any one of various commercially available game consoles, including Microsoft Xbox Series X/S® Sony Playstation 5®, and the like. Although video game consoles typically allow multiple players with split screens, most gamers and other players do not particularly like playing with split screens due to the small view available on the screens, visual/audio interference from the play of other players, cheating that results from seeing other player's screens, and other issues. Presently, gamers are usually hindered in getting together in a single room or like environment to play against each other with their own video and audio devices due to the difficulty and impracticability of transporting all of the required components to the meeting place and concerns with damaging one or more of the components, particularly the video device (e.g., a TV, monitor or the like).

In addition, it is also known that it is generally impractical to have sufficient game playing resources (e.g., TVs, monitors, speakers, and the like) available at the meeting place so the gamers do not have to transport their own components. As set forth in more detail below, the environment allows gamers and others to easily, safely and conveniently transport and play their video game console at any location, including a meeting place where they can play against the game console or other gamers by using the online or network gaming capabilities of the game console. In addition, the environment allows a user to transport the game console and related components to any location where he or she may want to play games and/or watch movies, with or without joining others.

As will be appreciated, the Screen Housing Plate may be made out of a wide variety of materials, including aluminum, plastic, carbon fiber or other metals, various plastic or composite materials, and other "soft materials," which are commonly used for cases. In some embodiments, the Screen Housing Plateis made out of a relatively sturdy material that is selected for its durability, toughness and being of a reasonable weight so the case can protect the video game console and LED screen and, preferably, results in a environment that does not weigh so much that it is difficult for a person to move.

The foregoing description comprises illustrative embodiments of the present invention.

As will be appreciated, the foregoing objects and examples are exemplary and embodiments need not meet all or any of the foregoing objects, and need not include all or any of the exemplary features described herein. Additional aspects and embodiments within the scope of the claims will be devised by those having skill in the art based on the teachings set forth herein.

While the invention has been described in connection with what are considered to be exemplary embodiments, it is to be understood that the invention is not limited to the disclosed embodiments, but on the contrary, is intended to cover various modifications and equivalent arrangements included within the spirit and scope of the appended claims.

We claim:

1. A portable gaming and entertainment system comprising:
    a video game console further comprising a USB receptor and an HDMI receptor;
    an integrated base, further comprising a USB connecting port, wherein said USB connecting port connects to the USB receptor of said video game console, an HDMI connecting port wherein said HDMI connecting port connects to the HDMI receptor of said video game console, a lumen for support cables which connect to said video game console, a first magnetic switch, and, at least one audio speaker; and
    an integrated monitor system that is pivotally attached to said integrated base wherein said integrated monitor system further comprises an LED screen, at least one interactive button, and a second magnetic switch, wherein the integrated base sends an HDMI command to said video game console to shut down said video game console when said first magnetic switch and said second magnetic switch come in contact with one another.

2. The portable gaming and entertainment system of claim 1 wherein said first magnetic switch and said second magnetic switch connect when the pivotally attached integrated monitor system is lowered to come into contact with said video game console.

3. The portable gaming and entertainment system of claim 1 wherein said video game console has a length side and a width side and said integrated monitor system has a length side and width side, such at the length side of said video game console matches the dimensions of the length side of said integrated monitor system; and, the width side of said video game console matches the dimensions of the width side of said integrated monitor system.

\* \* \* \* \*